United States Patent
Ahuja et al.

(10) Patent No.: US 10,296,934 B2
(45) Date of Patent: May 21, 2019

(54) MANAGING POWER, LIGHTING, AND ADVERTISING USING GAZE BEHAVIOR DATA

(71) Applicant: International Business Machines Corporation, Armonk, NY (US)

(72) Inventors: Karan Ahuja, New Delhi (IN); Ruchika Banerjee, New Delhi (IN); Kuntal Dey, New Delhi (IN); Seema Nagar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 15/002,746

(22) Filed: Jan. 21, 2016

(65) Prior Publication Data

US 2017/0213234 A1 Jul. 27, 2017

(51) Int. Cl.
*G06Q 30/02* (2012.01)
*G06F 3/01* (2006.01)
*G06F 3/0484* (2013.01)

(52) U.S. Cl.
CPC ......... *G06Q 30/0241* (2013.01); *G06F 3/013* (2013.01); *G06F 3/04842* (2013.01)

(58) Field of Classification Search
USPC .............. 348/78; 345/156; 705/14.41, 14.66
See application file for complete search history.

(56) References Cited

U.S. PATENT DOCUMENTS

| | | |
|---|---|---|
| 2007/0219865 A1 | 9/2007 | Wolf et al. |
| 2010/0007601 A1 | 1/2010 | Lashina et al. |
| 2010/0295774 A1* | 11/2010 | Hennessey ............. G06F 3/013 345/156 |
| 2011/0141011 A1 | 6/2011 | Lashina et al. |
| 2013/0073396 A1* | 3/2013 | Pradeep ................. G06Q 30/02 705/14.66 |
| 2014/0207559 A1* | 7/2014 | McCord ............ G06Q 30/0242 705/14.41 |

(Continued)

OTHER PUBLICATIONS

Liu et al. "What are customers looking at?" Visualization and Computer Vision Lab General Electric Global Research Center Niskayuna, NY, 12309, USA. 2007.

*Primary Examiner* — Saba Dagnew
(74) *Attorney, Agent, or Firm* — Ryan, Mason & Lewis, LLP (57) ABSTRACT

Methods, systems, and computer program products for managing power, lighting, and advertising using gaze behavior data are provided herein. A computer-implemented method includes processing gaze behavior data arising from gazes directed towards a plurality of items, wherein said processing comprises comparing a number of gazes directed at each of the items; mapping the gaze behavior data to a collection of illumination devices, wherein each of the items is illuminated by one or more of the illumination devices, and wherein said mapping comprises correlating, for each item, the processed gaze behavior data arising from the item to the illumination devices that illuminate the item; and generating instructions for controlling the illumination devices based on the gaze behavior data and said mapping, wherein said instructions comprise an instruction to modify intensity of at least one of the illumination devices and/or modify a color emitted by at least one of the illumination devices.

18 Claims, 5 Drawing Sheets

(56) References Cited

U.S. PATENT DOCUMENTS

2014/0289009 A1    9/2014   Campbell
2015/0085097 A1*   3/2015   Larsen ..................... H04N 5/33
                                                            348/78

* cited by examiner

MANAGING POWER, LIGHTING, AND ADVERTISING USING GAZE BEHAVIOR DATA

FIELD

The present application generally relates to information technology, and, more particularly, to management of gaze behavior data.

BACKGROUND

Commonly, in retail stores and other commercial venues, items are placed and/or displayed on racks in aisles for customers to purchase. However, such items may not be positioned and/or displayed in a manner that distinguishes them from other items and/or products. Also, in many stores, items are routinely advertised with flyers and signs. However, such methods of displaying and advertising products are often incapable of adapting as the demand of customers changes.

SUMMARY

In one embodiment of the present invention, techniques for managing power, lighting, and advertising using gaze behavior data are provided. An exemplary computer-implemented method can include processing gaze behavior data arising from gazes directed towards a plurality of items on a display, wherein said processing comprises comparing a number of gazes from one or more people directed at each of the plurality of items. The method can also include mapping the processed gaze behavior data to a collection of multiple illumination devices, wherein each of the plurality of items is illuminated by one or more of the multiple illumination devices, and wherein said mapping comprises correlating, for each of the plurality of items, (i) the processed gaze behavior data arising from the item to (ii) the one or more illumination devices that illuminate the item. Further, the method can include generating instructions for controlling the collection of multiple illumination devices based on (i) the processed gaze behavior data arising from each of the plurality of items and (ii) said mapping, wherein said instructions comprise at least one of (a) an instruction to modify the level of illumination intensity of at least one of the illumination devices and (b) an instruction to modify a color of illumination emitted by at least one of the illumination devices.

In another embodiment of the invention, an exemplary computer-implemented method can include steps of collecting gaze behavior data arising from gazes directed towards a plurality of items on a display; configuring placement positions for the plurality of items on the display based on at least (i) the collected gaze behavior data and (ii) one or more advertisements associated with (a) one or more of the plurality of items and/or (b) one or more of the placement positions; and modifying the level of illumination intensity of each of one or more illumination devices associated with the plurality of items on the display based on (i) the collected gaze behavior data, (ii) the one or more advertisements associated with (a) one or more of the plurality of items and/or (b) one or more of the placement positions, and (iii) the placement positions for the plurality of items on the display.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Illustrative embodiments of the invention will be described herein with reference to exemplary communication, storage and processing devices. It is to be appreciated, however, that the invention is not restricted to use with the particular illustrative configurations shown. As will be described, one or more embodiments of the invention include utilizing eye gaze data tracking for managing store power, rack lighting, and/or in-store advertising of physical products.

For example, at least one embodiment of the invention includes tracking gazes of customers and/or shoppers and illuminating items and/or products on display based on the tracked customer gaze behavior data arising from one or more of the items and the distance of a customer to the one or more items. At least one embodiment of the invention also includes controlling the manner in which items are illuminated on a display by controlling the amount, color, and intensity of illumination. Such an embodiment can further include managing store power by dimming store lights in sections of the store (for example, in sections where no shopper is gazing), determining product placement slots for advertisers, and providing additional lighting where a shopper is looking (based on captured gaze behavior data).

Product placement slots can include, for example, placements on a store rack or display, and in one or more embodiments of the invention, advertisers may desire to place particular products with additional illumination and/or different color and/or intensity of illumination, as compared to other products. Additionally, at least one embodiment of the invention include requesting and processing advertisements from product sellers, wherein such advertisements can pertain to a seller desiring and/or requesting to place one or more particular products in one or more particular placement slots on the display/rack that are more frequently gazed upon by shoppers/customers than other placement slots on the display/rack. In such an embodiment, the advertiser (product seller) pays for the customers gazing behavior arising from the one or more particular placement slots. Further, one or more embodiments of the invention can include highlighting (via illumination intensity changes and/or illumination color changes) the one or more particular placement slots associated with a paid advertisement to attract customer gazes. Additionally, in such an embodiment of the invention, a billing mechanism can be implemented that is based upon the actual gazing behavior of customers.

Figure 1:
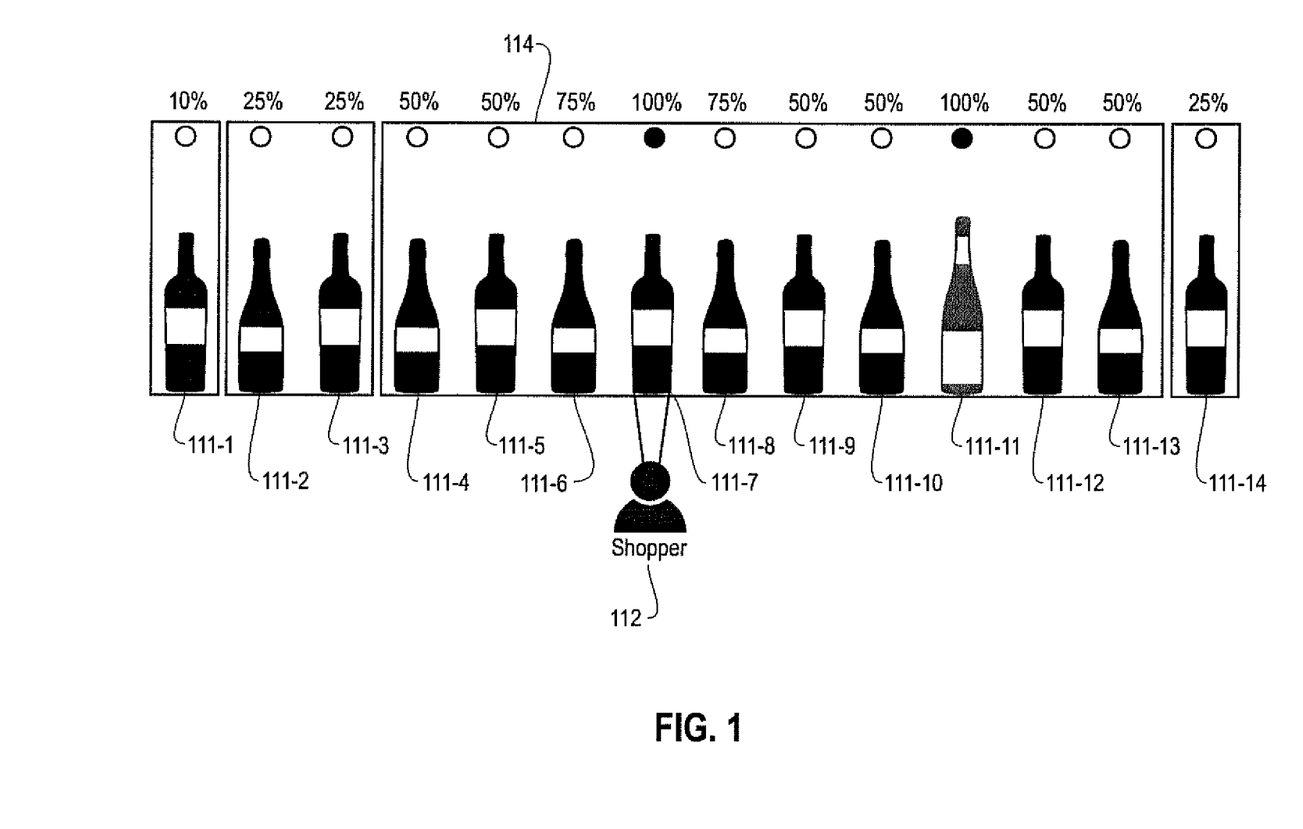
FIG. 1 is a schematic diagram illustrating an exemplary embodiment of the invention.

FIG. 1 is a schematic diagram illustrating an exemplary embodiment of the invention. The diagram includes bottles 111-1-111-14, a shopper 112, and a store display 114 (which houses the bottles). In the example embodiment depicted in FIG. 1, the shopper 112 views bottle 111-7, and the viewing is detected. The detection results in bottle 111-7 being illuminated and/or highlighted by an illumination device (housed within the display and/or proximate to the display), such as a light-emitting diode (LED), focused on bottle 111-7. Based on the processed gaze data detected in connection with the shopper's viewing, the example embodiment of the invention illustrated in FIG. 1 includes controlling the illumination device corresponding to bottle 111-7 to render light with 100% intensity.

In addition, the shopper's viewing of bottle 111-7 triggers illumination of surrounding bottles 111-1 to 111-6 and 111-8 to 111-14 on the display 114. For example, as depicted, based on the above-noted gaze behavior data of the shopper 112, bottle 111-1 is illuminated with 10% intensity, bottles 111-2 and 111-3 are illuminated with 25% intensity, bottles 111-4 and 111-5 are illuminated with 50% intensity, bottles 111-6 and 111-8 are illuminated with 75% intensity, bottles 111-9 and 111-10 are illuminated with 50% intensity, bottles 111-12 and 111-13 are illuminated with 50% intensity, and bottle 111-14 is illuminated with 25% intensity.

Also, as depicted in FIG. 1, one or more embodiments of the invention can include implementing specialized illumination of a bottle for one or more reasons (potentially unrelated to shopper gaze behavior). For example, bottle 111-11 can be selected for specialized advertising, and, as a result, bottle 111-11 is illuminated with 100% intensity (and/or illuminated with a different color than the other bottles).

By way of further illustration, one or more embodiments of the invention can be demonstrated via the following example. User A visits Store A, which displays products on a set of racks. User A has chosen to go to the bread section, and User A views the third rack from the left in the bread section, which has positioned therein Brand X breads. User A starts moving towards this rack, and as User A enters the bread section at a distance of, for example, eight feet from the display of Brand X breads, and while looking at the Brand X bread, an example embodiment of the invention includes detecting User A's gaze and illuminating half of the supplementary LED lights fitted at the third rack from the left. In one or more embodiments of the invention, the detection process uses gaze tracking devices, such as cameras mounted to a rack, to detect a user's gaze directed at an item. As further detailed in connection with FIG. 2, the data arising from the detection of such a gaze can be captured and sent to an analytics engine to analyze the data and generate a set of status instructions to be sent, for example, to an LED status controller associated with the store racks.

The LED status controller can then implement a set of status instructions related to the captured gaze behavior data. Such instructions can include, for example, initiating LEDs mounted on the rack to illuminate the product(s) on the rack to an identified illumination intensity percentage and/or with an identified illumination color. Referring back to the above-noted example, based on the detection of User A's gaze directed at the third rack from the left in the bread section, the second and fourth racks from the left, respectively, can also be illuminated with 25% of the maximum intensity of the LED lights fitted to those racks.

Continuing with the example illustration, assume that User A approaches closer to the third rack from the left, while continuing to look at Brand X breads. During the approach, Brand X breads are receiving the highest level of focus (in relation to the other items on the rack), and based on this detected gaze behavior data, an exemplary embodiment of the invention can include implementing an instruction that Brand X breads receive 100% of the maximum intensity of the LED lights focused towards Brand X breads. Also, such an embodiment of the invention can additionally include implementing an instruction that all of the LEDs positioned immediately above Brand Y breads, which are positioned immediately to the left but on the same rack as Brand X breads, and Brand Z breads, which are positioned immediately to the right but on the same rack as Brand Y breads, are illuminated to 75% of their maximum intensity. In accordance with such an example embodiment of the invention, the rest of the rack LEDs can be illuminated lit up to 50% of their maximum intensity.

As noted above in connection with FIG. 1, one or more embodiments of the invention can include implementing and/or facilitating sponsored placement and/or management of one or more products on a given store rack. Such an embodiment can include illuminating a sponsored product at a higher level of illumination intensity as compared to other products on the given store rack. Additionally, such an embodiment can also include performance-based advertising and/or billing based on, for example, the number of customer gazes directed at a sponsored product, the duration of such customer gazes, the intensity of the illumination directed at the sponsored product, etc.

Figure 2:
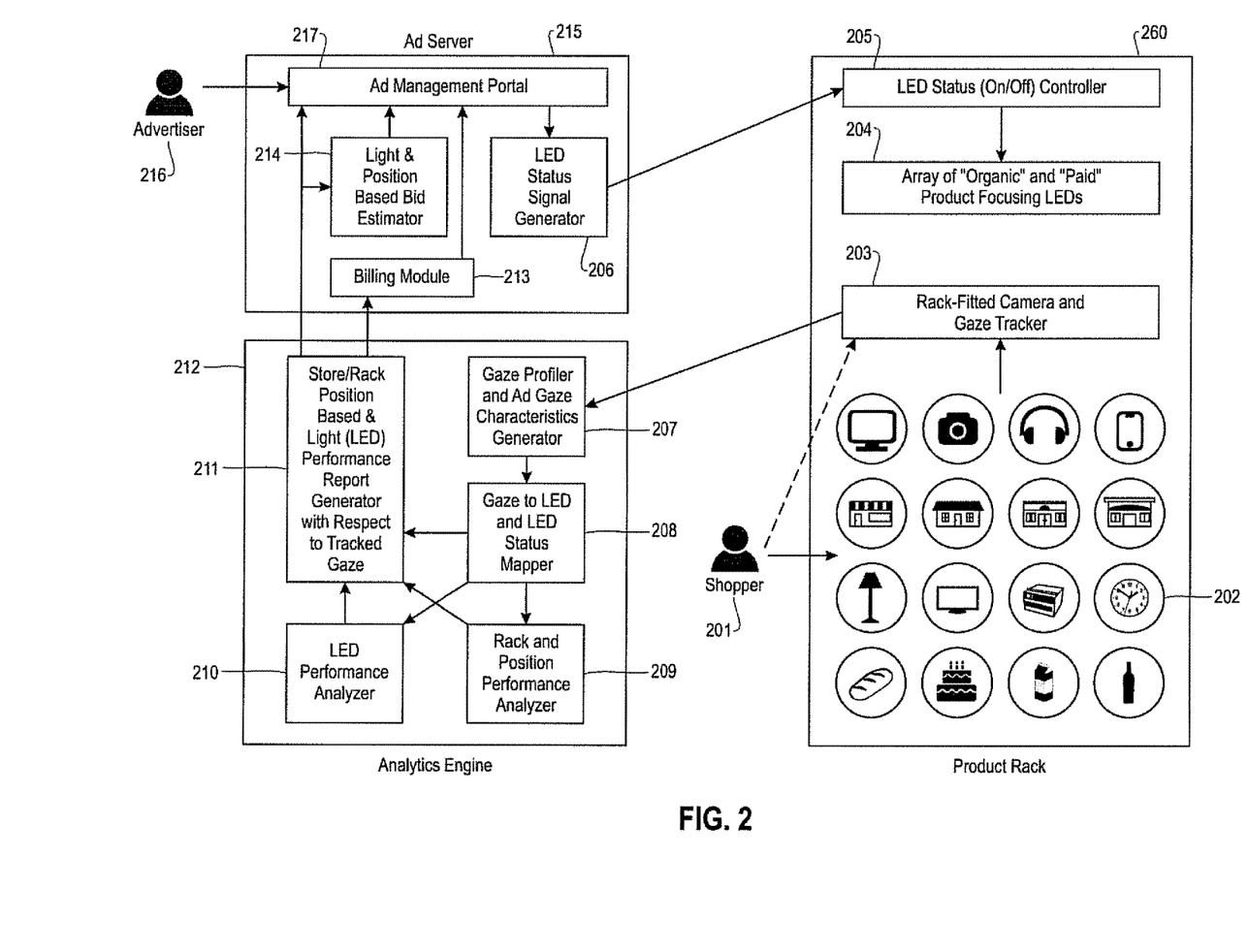
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts a shopper 201, a product rack 260, an analytics engine 212, an advertisement (ad) server 215, and an advertiser 216.

The product rack 260 can include multiple products 202, one or more rack fitted cameras and gaze trackers 203, an array of "organic" and "paid" product focusing LEDs 204, and an LED Status (on/oft) Controller 205. As used herein, a customer view is "organic," if the customer viewed a product directly without looking at any adjacent products (even if the product is being advertised). As also used herein, a "paid view" refers to the situation in which a customer views a product and/or part of a product that is highlighted with additional lighting of a color and/or intensity that is different than other proximate products, wherein the additional highlighting and/or different color towards the product is applied because the product is at a premium/desired slot on the display that is paid for by the company selling the product. Further, a store can include a number of racks containing multiple products, wherein each rack (such as rack 260) can have a finite height, width, and depth. In one or more embodiments of the invention, each rack includes one or more cameras that include capabilities pertaining to a given level of frames per second and pixel resolution. In at least one alternate embodiment of the invention, multiple racks can share and/or use the same one or more video cameras.

Also, in one or more embodiments of the invention, the camera(s) associated with each rack can be kept on and continuously running. Further, in at least one embodiment of the invention, each rack can include an array of low-powered lights (such as, but not limited to, small 5 milliwatt LED lights), such that at least one light can be used to focus on a part or the whole of the products kept on the associated rack.

Referring again to FIG. 2, and as further detailed below, the analytics engine 212 includes a gaze profiler and ad gaze characteristics generator 207, a gaze to LED and LED status mapper 208, a rack and position performance analyzer 209, an LED performance analyzer 210, and a store/rack position based and light performance report generator 211 with respect to tracked gazes. Additionally, and as also further detailed below, the ad server 215 includes a billing module 213, a light and position based bid estimator 214, an ad management portal 217, and an LED status signal generator 206.

As depicted in FIG. 2, shopper 201 gazes upon products 202, and the rack-fitted cameras and gaze tracker 203 detect the shopper's gaze and/or body near the products 201. In one or more embodiments of the invention, gaze tracking can be based, for example, on a heat map generation. The data detected via the cameras and gaze tracker 203 are sent to the gaze profiler and ad gaze characteristics generator 207, which identifies and differentiates between organic and paid views of a product. The characteristics and detection data are sent to the gaze to LED and LED status mapper 208, wherein the tracked gaze data arising from the products 202 placed on the product rack 260 are mapped. Such a mapping process, by way merely of illustration, can include the following sequence of events: A shopper gazes at a product, which is placed at a particular slot on a display/rack. Some of the LEDs (among a collection of multiple LEDs present at the display/rack) have the capability to focus onto that particular slot. Accordingly, a mapping is carried out from the gaze point to the collection of multiple LEDs, such that the appropriate LEDs for controlling the intensity of illumination (or for controlling the color of illumination) can be identified.

In one or more embodiments of the invention, the characteristics generator 207 can also send the instructions and detection data to the store/rack position based and light performance report generator 211.

In one or more embodiments, the rack and position performance analyzer 209 receives input from the gaze to LED and LED status mapper 208, and, based on such input, dynamically profiles product placement slots and identifies appropriate placement slots of different value. In addition, based upon cumulative gaze behavior data analysis and product highlighting capabilities, the determination of advertising placement slots can be modified over time as overall customer behavior trends change and store product settings change. In one or more embodiments of the invention, once appropriate placement slots have been identified, products of different categories, values, and with different advertising budgets, can be positioned in the placement slots (for example, by advertisers). Also, from the rack and position performance analyzer 209, analysis is sent to the store/rack position based and light performance report generator 211.

In at least one embodiment of the invention, the gaze to LED and LED status mapper 208 sends to both the rack and position performance analyzer 209 and the LED performance analyzer 210 the list of LEDs for each rack position that changed intensity for each given shopper, as well as the level of intensity for each LED prior to the change and after the change. The rack and position performance analyzer 209 analyzes the performance (that is, how much gaze focus each LED draws) of the LEDs at different intensities, colors, rack positions, etc. The LED performance analyzer 210 aggregates and analyzes the performance of LEDs with respect to the rack positions (that is, how much gaze data each of the rack positions receive, etc., as well as finer granularities such as whether the positions are paid rack positions, under what lighting conditions does a given rack position perform better by drawing more gaze focus, etc.). The rack and position performance analyzer 209 and the LED performance analyzer 210 generate results of the analyses that can, in turn, be sent to the store/rack position based and light performance report generator 211 for report generation.

Accordingly, in at least one embodiment of the invention, the LED performance analyzer 210 receives input from the gaze to LED and LED status mapper 208. Further, the LED performance analyzer 210 provides an output to the store/rack position based and light performance report generator 211, which generates a performance report based on information provided by the gaze to LED and LED status mapper 208, the rack and position performance analyzer 209, and the LED performance analyzer 210. Also, in one or more embodiments of the invention, the performance report generator 211 can generate reports pertaining, for example, to the performance of each organic and paid view, and aggregate such views to form an overall view summary and detailed view profile. The report(s) can be sent to the billing module 213.

In at least one embodiment of the invention, the billing module 213 generates a bill for one or more advertisers of the multiple products 202 being advertised in stores based on gaze-related performance, such as exposure parameters containing, but not limited to, the number of users viewing the products, the total number of times the products were highlighted, the total highlight duration, the total highlight intensity and power consumed, and the fine-tuning of the highlighting of the advertised products. In addition, in one or more embodiments of the invention, billing can be based upon the personalization of the focused highlighting, concurrent viewers, gaze confidence and duration, as well as different areas of the product impacted by the gaze behavior data (such as price tags, brand names, etc.). Further, the light and position based bid estimator 214 sends one or more bid estimations to the ad management portal 217. The bid estimations can be computed and used to select the winner for receiving paid highlighting by having a selected product placed at one or more premium/desired slots on the display/rack.

Also, in at least one embodiment of the invention, the advertiser 216 can submit instructions and/or requests relating to advertising products in the store to the ad management portal 217. Such instructions and/or request can include, for example, the positioning and placement of a particular product, as well as the intensity and/or color of the illumination on the product or parts of the products. In addition, the advertiser 216 can add products and select placement slots among available placement options, depending upon reported characteristics of gaze behavior data.

The ad management portal 217 sends bidding information to the LED status signal generator 206, which then outputs a signal (such as an instruction to turn on or off LEDs, to increase or decrease the intensity of LEDs, and/or to change colors of the LEDs) to the LED status controller 205. The bidding information noted above determines whether and how much (that is, how intensely) an LED can illuminate, and/or what color the LED is to illuminate, based upon user gaze data, advertiser budgets, advertising conditions (policies under which an ad should trigger), etc. In one or more embodiments of the invention, the LED status controller 205 can include a set of software-operated switches that can turn on and off lights based upon received and/or generated instructions. Accordingly, the LED status controller 205 can output directions and thereby control the array of organic and paid product focusing LEDs 204.

Figure 3:
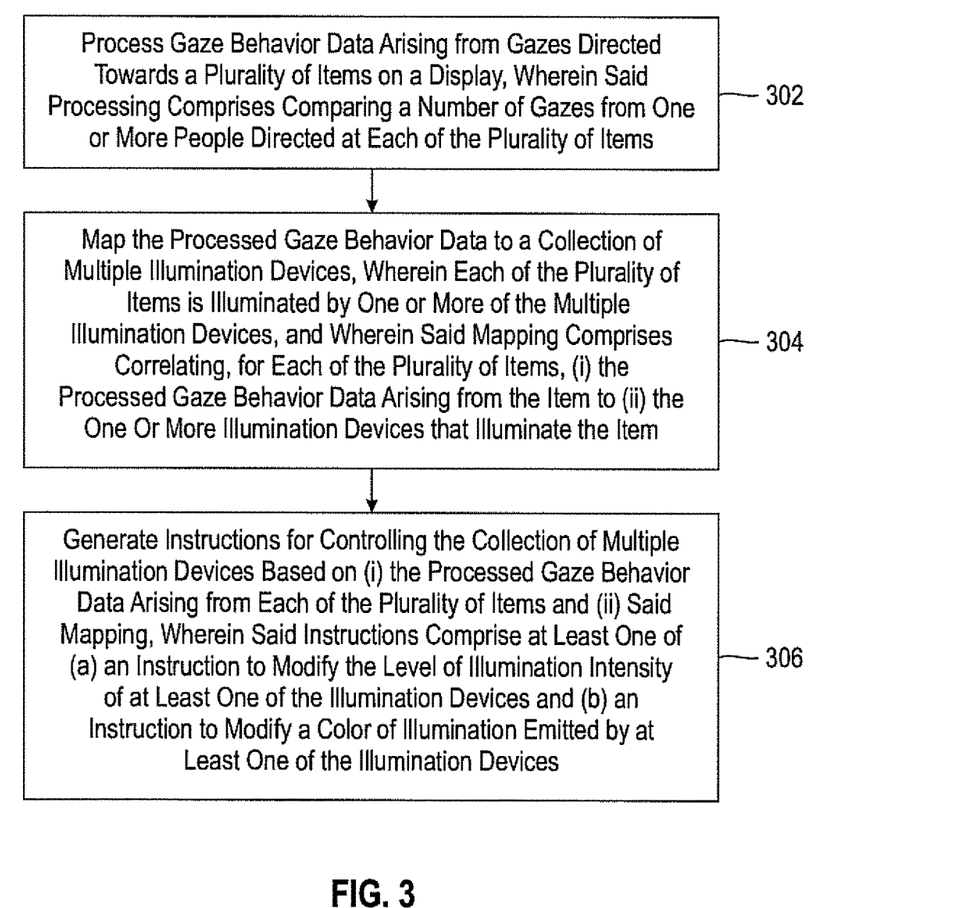
FIG. 3 is a flow diagram illustrating techniques according to an embodiment of the invention.

FIG. 3 is a flow diagram illustrating techniques according to an embodiment of the present invention. Step 302 includes processing gaze behavior data arising from gazes directed towards a plurality of items on a display, wherein said processing comprises comparing a number of gazes from one or more people directed at each of the plurality of items. Processing can also include recording the duration of each gaze from the one or more people directed at each of the plurality of items.

Step 304 includes mapping the processed gaze behavior data to a collection of multiple illumination devices, wherein each of the plurality of items is illuminated by one or more of the multiple illumination devices, and wherein said mapping comprises correlating, for each of the plurality of items, (i) the processed gaze behavior data arising from the item to (ii) the one or more illumination devices that illuminate the item.

Step 306 includes generating instructions for controlling the collection of multiple illumination devices based on (1) the processed gaze behavior data arising from each of the plurality of items and (ii) said mapping, wherein said instructions comprise at least one of (a) an instruction to modify the level of illumination intensity of at least one of the illumination devices and (b) an instruction to modify a color of illumination emitted by at least one of the illumination devices. The instruction to modify the level of illumination intensity of at least one of the illumination devices can include an instruction to set each of the illumination devices at a distinct level of illumination intensity.

In at least one embodiment of the invention, the instructions can include at least one of (a) an instruction to modify the level of illumination intensity of at least one of the illumination devices based on the distance from one or more of the plurality of items to a particular one of the plurality items, and (b) an instruction to modify a color of illumination emitted by at least one of the illumination devices based on the distance from one or more of the plurality of items to the particular one of the plurality items. Additionally, the instructions can include at least one of (a) an instruction to modify the level of illumination intensity of at least one of the illumination devices based on the number of people within a predetermined distance of the display, and (b) an instruction to modify a color of illumination emitted by at least one of the illumination devices based on the number of people within a predetermined distance of the display.

Further, in at least one embodiment of the invention, the instructions can include at least one of (a) an instruction to modify the level of illumination intensity of at least one of the illumination devices based on time of day, and (b) an instruction to modify a color of illumination emitted by at least one of the illumination devices based on time of day. Also, the instructions can include at least one of (a) an instruction to modify the level of illumination intensity of at least one of the illumination devices based on an advertisement associated with one or more of the items, and (b) an instruction to modify a color of illumination emitted by at least one of the illumination devices based on an advertisement associated with one or more of the items.

The techniques depicted in FIG. 3 can also include determining one or more preferred item placement positions on the display for one or more or the plurality of items based on the processed gaze behavior data arising from each of the plurality of items, wherein the one or more preferred item placement positions correspond to a larger number of gazes from the one or more people relative to other placement positions. At least one embodiment of the invention can additionally include processing one or more payment bids for placing one or more items in the one or more preferred item placement positions. Further, in such an embodiment, generating instructions for controlling the collection of multiple illumination devices can be further based on a payment for placement of one or more items in the one or more preferred item placement positions.

Also, the techniques depicted in FIG. 3 can further include generating a performance report pertaining to the plurality of items based on the processed gaze behavior data.

Figure 4:
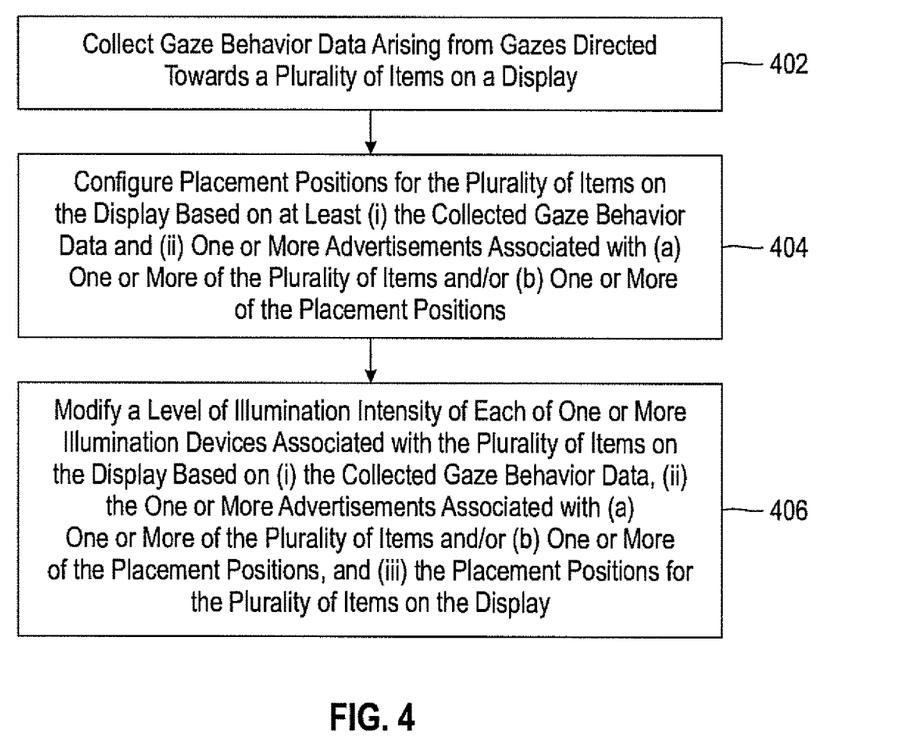
FIG. 4 is a flow diagram illustrating techniques according to an embodiment of the invention.

FIG. 4 is a flow diagram illustrating techniques according to an embodiment of the present invention. Step 402 includes collecting gaze behavior data arising from gazes directed towards a plurality of items on a display. Step 404 includes configuring placement positions for the plurality of items on the display based on at least (i) the collected gaze behavior data and (ii) one or more advertisements associated with (a) one or more of the plurality of items and/or (b) one or more of the placement positions. Step 406 includes modifying the level of illumination intensity of each of one or more illumination devices associated with the plurality of items on the display based on (i) the collected gaze behavior data, (ii) the one or more advertisements associated with (a) one or more of the plurality of items and/or (b) one or more of the placement positions, and (iii) the placement positions for the plurality of items on the display.

The techniques depicted in FIG. 4 can also include modifying a color of illumination emitted by each of the one or more illumination devices associated with the plurality of items on the display based on (i) the collected gaze behavior data, (ii) the one or more advertisements associated with one or more of the plurality of items, and (iii) the placement positions for the plurality of items on the display.

The techniques depicted in FIG. 3 and FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 and FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
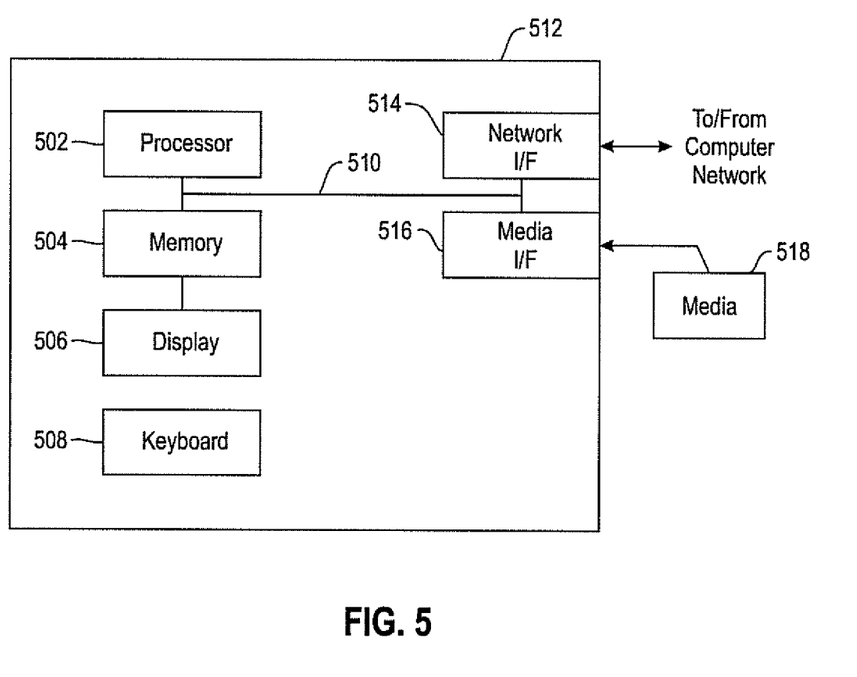
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, illuminating items and/or products on display at a store based on customer gaze behavior data arising from one or more of the items.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising steps of:
   collecting gaze behavior data arising from gazes directed towards a plurality of items on a display;
   processing gaze behavior data arising from gazes directed towards a plurality of items on a display, wherein said processing comprises comparing a number of gazes from one or more people directed at each of the plurality of items;
   mapping the processed gaze behavior data to a collection of multiple illumination devices, wherein each of the plurality of items is illuminated by one or more of the multiple illumination devices, and wherein said mapping comprises correlating, for each of the plurality of items, (i) the processed gaze behavior data arising from the item to (ii) the one or more illumination devices that illuminate the item;

controlling the collection of multiple illumination devices based on (i) the processed gaze behavior data arising from each of the plurality of items and (ii) said mapping, wherein said controlling comprises:
(a) modifying the level of illumination intensity of at least one of the illumination devices and (b) modifying a color of illumination emitted by at least one of the illumination devices, and wherein said controlling further comprises: (c) modifying the level of illumination intensity of at least one of the illumination devices based on time of day, and (d) modifying a color of illumination emitted by at least one of the illumination devices based on time of day;

dynamically profiling item placement positions on the display based on the processed gaze behavior data;
attributing one or more values to one of more of the placement positions based on said profiling;
analyzing, based on the processed gaze behavior data, performance of the multiple illumination devices with respect to conditions comprising (i) multiple levels of illumination intensity, multiple illumination colors, and multiple item placement positions on the display; and
determining (i) one or more preferred item placement positions on the display and (ii) one or more preferred illumination conditions for one or more or the plurality of items based on said attributing and said analyzing;
wherein the steps are carried out by at least one computing device.

2. The computer-implemented method of claim 1 comprising: processing one or more payment bids for placing one or more items in the one or more preferred item placement positions.

3. The computer-implemented method of claim 1, wherein said generating instructions for controlling the collection of multiple illumination devices is further based on a payment for placement of one or more items in the one or more preferred item placement positions.

4. The computer-implemented of claim 1, wherein said processing further comprises recording the duration of each gaze from the one or more people directed at each of the plurality of items.

5. The computer-implemented method of claim 1, wherein said controlling comprises: (a) modifying the level of illumination intensity of at least one of the illumination devices based on the distance from one or more of the plurality of items to a particular one of the plurality items, and (b) modifying a color of illumination emitted by at least one of the illumination devices based on the distance from one or more of the plurality of items to the particular one of the plurality items.

6. The computer-implemented method of claim 1, wherein said controlling comprises: (a) modifying the level of illumination intensity of at least one of the illumination devices based on the number of people within a predetermined distance of the display, and (b) modifying a color of illumination emitted by at least one of the illumination devices based on the number of people within a predetermined distance of the display.

7. The computer-implemented method of claim 1, wherein said instructions comprise controlling comprises: (a) modifying the level of illumination intensity of at least one of the illumination devices based on an advertisement associated with one or more of the items, and (b) modifying a color of illumination emitted by at least one of the illumination devices based on an advertisement associated with one or more of the items.

8. The computer-implemented method of claim 1, wherein said modifying the level of illumination intensity of at least one of the illumination devices comprises setting each of the illumination devices at a distinct level of illumination intensity.

9. The computer-implemented method of claim 1, comprising: generating a performance report pertaining to the plurality of items based on the processed gaze behavior data.

10. A computer program product comprising a non-transitory computer readable storage medium having program instructions embodied therewith, the program instructions executable by a device to cause the device to:
collect gaze behavior data arising from gazes directed towards a plurality of items on a display;
process gaze behavior data arising from gazes directed towards a plurality of items on a display, wherein said processing comprises comparing a number of gazes from one or more people directed at each of the plurality of items;
map the processed gaze behavior data to a collection of multiple illumination devices, wherein each of the plurality of items is illuminated by one or more of the multiple illumination devices, and wherein said mapping comprises correlating, for each of the plurality of items, (i) the processed gaze behavior data arising from the item to (ii) the one or more illumination devices that illuminate the item;
controlling the collection of multiple illumination devices based on (i) the processed gaze behavior data arising from each of the plurality of items and (ii) said mapping, wherein said controlling comprises:
(a) modifying the level of illumination intensity of at least one of the illumination devices and (b) modifying a color of illumination emitted by at least one of the illumination devices, and wherein said controlling further comprises: (c) modifying the level of illumination intensity of at least one of the illumination devices based on time of day, and (d) modifying a color of illumination emitted by at least one of the illumination devices based on time of day;
dynamically profile item placement positions on the display based on the processed gaze behavior data;
attribute one or more values to one of more of the placement positions based on said profiling;
analyze, based on the processed gaze behavior data, performance of the multiple illumination devices with respect to conditions comprising (i) multiple levels of illumination intensity, multiple illumination colors, and multiple item placement positions on the display; and
determine (i) one or more preferred item placement positions on the display and (ii) one or more preferred illumination conditions for one or more or the plurality of items based on said attributing and said analyzing.

11. The computer program product of claim 9, wherein said processing further comprises recording the duration of each gaze from the one or more people directed at each of the plurality of items.

12. The computer program product of claim 9, wherein said controlling comprises (a) modifying the level of illumination intensity of at least one of the illumination devices based on the distance from one or more of the plurality of items to a particular one of the plurality items, and (b) modifying a color of illumination emitted by at least one of the illumination devices based on the distance from one or more of the plurality of items to the particular one of the plurality items.

13. The computer program product of claim 9, wherein said controlling comprises: (a) an instruction to modify modifying the level of illumination intensity of at least one of the illumination devices based on the number of people within a predetermined distance of the display, and (b) modifying a color of illumination emitted by at least one of the illumination devices based on the number of people within a predetermined distance of the display.

14. The computer program product of claim 9, wherein said controlling comprises: (a) modifying the level of illumination intensity of at least one of the illumination devices based on time of day, and (b) modifying a color of illumination emitted by at least one of the illumination devices based on time of day.

15. The computer program product of claim 9, wherein said controlling comprises: (a) modifying the level of illumination intensity of at least one of the illumination devices based on an advertisement associated with one or more of the items, and (b) modifying a color of illumination emitted by at least one of the illumination devices based on an advertisement associated with one or more of the items.

16. A system comprising:
a memory; and at least one processor coupled to the memory and configured for:
collecting gaze behavior data arising from gazes directed towards a plurality of items on a display;
processing gaze behavior data arising from gazes directed towards a plurality of items on a display, wherein said processing comprises comparing a number of gazes from one or more people directed at each of the plurality of items;
mapping the processed gaze behavior data to a collection of multiple illumination devices, wherein each of the plurality of items is illuminated by one or more of the multiple illumination devices, and wherein said mapping comprises correlating, for each of the plurality of items, (i) the processed gaze behavior data arising from the item to (ii) the one or more illumination devices that illuminate the item;
controlling the collection of multiple illumination devices based on (i) the processed gaze behavior data arising from each of the plurality of items and (ii) said mapping, wherein said controlling comprises: (a) modifying the level of illumination intensity of at least one of the illumination devices and (b) modifying a color of illumination emitted by at least one of the illumination devices, and wherein said controlling further comprises: (c) modifying the level of illumination intensity of at least one of the illumination devices based on time of day, and (d) modifying a color of illumination emitted by at least one of the illumination devices based on time of day;
dynamically profiling item placement positions on the display based on the processed gaze behavior data;
attributing one or more values to one of more of the placement positions based on said profiling; analyzing, based on the processed gaze behavior data, performance of the multiple illumination devices with respect to conditions comprises comprising (i) multiple levels of illumination intensity, multiple illumination colors, and multiple item placement positions on the display; and determining (i) one or more preferred item placement positions on the display and (ii) one or more preferred illumination conditions for one or more or the plurality of items based on said attributing and said analyzing.

17. A computer-implemented method comprising steps of:
collecting gaze behavior data arising from gazes directed towards a plurality of items on a display;
configuring placement positions for the plurality of items on the display based on at least (i) the collected gaze behavior data and (ii) one or more advertisements associated with (a) one or more of the plurality of items and (b) one or more of the placement positions;
modifying the level of illumination intensity of each of one or more illumination devices associated with the plurality of items on the display based on (i) the collected gaze behavior data, (ii) the one or more advertisements associated with (a) one or more of the plurality of items and (b) one or more of the placement positions, (iii) the placement positions for the plurality of items on the display, and (iv) time of day;
dynamically profiling item placement positions on the display based on the processed gaze behavior data;
attributing one or more values to one of more of the placement positions based on said profiling;
analyzing, based on the processed gaze behavior data, performance of the multiple illumination devices with respect to conditions comprising (i) multiple levels of illumination intensity, multiple illumination colors, and multiple item placement positions on the display; and
determining (i) one or more preferred item placement positions on the display and (ii) one or more preferred illumination conditions for one or more or the plurality of items based on said attributing and said analyzing;
wherein the steps are carried out by at least one computing device.

18. The computer-implemented method of claim 17, comprising: modifying a color of illumination emitted by each of the one or more illumination devices associated with the plurality of items on the display based on (i) the collected gaze behavior data, (ii) the one or more advertisements associated with one or more of the plurality of items, and (iii) the placement positions for the plurality of items on the display.

* * * * *